US012050167B2

(12) United States Patent
Pereira Arede et al.

(10) Patent No.: US 12,050,167 B2
(45) Date of Patent: Jul. 30, 2024

(54) DEVICE AND METHOD FOR DETECTING REACTIVE LUMINESCENT NANO- OR MICRO- PARTICLES

(71) Applicant: Spin & Turn—Consultadoria de Software, Lda, Aveiro (PT)

(72) Inventors: João Paulo Pereira Arede, Aveiro (PT); Rui Tiago Ferreira Pina, Gafanha da Nazaré (PT)

(73) Assignee: SPIN & TURN—CONSULTADORIA DE SOFTWARE, LDA, Aveiro (PT)

( * ) Notice: Subject to any disclaimer, the term of this patent is extended or adjusted under 35 U.S.C. 154(b) by 255 days.

(21) Appl. No.: 17/774,227

(22) PCT Filed: Nov. 25, 2020

(86) PCT No.: PCT/IB2020/061141
§ 371 (c)(1),
(2) Date: May 4, 2022

(87) PCT Pub. No.: WO2021/105895
PCT Pub. Date: Jun. 3, 2021

(65) Prior Publication Data
US 2022/0397507 A1    Dec. 15, 2022

(30) Foreign Application Priority Data
Nov. 25, 2019   (PT) .......................... 115932

(51) Int. Cl.
*G01N 15/06*   (2024.01)
*B42D 25/382*  (2014.01)
(Continued)

(52) U.S. Cl.
CPC ........... *G01N 15/06* (2013.01); *B42D 25/382* (2014.10); *B42D 25/387* (2014.10); *G01N 2015/0038* (2013.01); *G01N 15/075* (2024.01)

(58) Field of Classification Search
CPC ................. G01N 15/06; G01N 15/075; G01N 2015/0038; G01N 2015/0061;
(Continued)

(56) References Cited

U.S. PATENT DOCUMENTS

| 4,259,574 A | 3/1981 | Carr et al. |
| 4,618,257 A | 10/1986 | Bayne et al. |

(Continued)

FOREIGN PATENT DOCUMENTS

| DE | 102017129986 A1 | 6/2019 |
| EP | 3605067 A1 | 2/2020 |

(Continued)

OTHER PUBLICATIONS

International Search Report in corresponding PCT Application No. PCT/IB2020/061141 mailed Apr. 15, 2021.
(Continued)

*Primary Examiner* — Courtney D Thomas
(74) *Attorney, Agent, or Firm* — Leason Ellis LLP

(57) ABSTRACT

Device for detecting reactive luminescent particles embedded in a substrate or surface having an infrared or ultraviolet illuminator; a near-infrared photodiode sensor; a dark chamber, inside which the illuminator and photodiode sensor are mounted; a logarithm amplifier; an electronic data processor configured to detect the reactive luminescent particles by carrying out the steps of: illuminating the substrate or surface with the illuminator; acquiring the amplified linearized signal captured by the photodiode sensor; detecting the presence of luminescent particles in the substrate or surface from the linearized decay of the acquired signal. A further near-infrared photodiode sensor, a further logarithm amplifier, and a differentiator for obtaining a difference between amplified signals received by each photodiode sensor can be utilized.

20 Claims, 6 Drawing Sheets

(51) Int. Cl.
  *B42D 25/387*  (2014.01)
  *G01N 15/00*  (2024.01)
  *G01N 15/075*  (2024.01)

(58) Field of Classification Search
  CPC ....... G01N 2201/0221; G01N 21/6408; B42D 25/382; B42D 25/387; G07D 7/1205; G07D 7/121
  See application file for complete search history.

(56) References Cited

U.S. PATENT DOCUMENTS

| | | | |
|---|---|---|---|
| 5,757,001 A | 5/1998 | Burns | |
| 2001/0033371 A1* | 10/2001 | Lawandy | G01N 21/6428 356/71 |
| 2013/0048874 A1 | 2/2013 | Rapoport et al. | |

FOREIGN PATENT DOCUMENTS

| | | |
|---|---|---|
| GB | 2095822 A | 10/1982 |
| KR | 101297702 B1 | 8/2013 |
| WO | 1989008224 A1 | 9/1989 |
| WO | 2018181134 A1 | 10/2018 |

OTHER PUBLICATIONS

Christopher M. Long, "Carbon black vs. black carbon and other airborne materials containing elemental carbon: Physical and chemical distinctions", Environmental Pollution, Jun. 2013, pp. 271-286.

* cited by examiner

DEVICE AND METHOD FOR DETECTING REACTIVE LUMINESCENT NANO- OR MICRO- PARTICLES

CROSS-REFERENCE TO RELATED APPLICATIONS

This application is a U.S. National Stage Application under 35 U.S.C. § 371 of International Patent Application No. PCT/IB2020/061141, filed Nov. 25, 2020, which claims priority to Portugal Patent Application No. 115932, filed Nov. 25, 2019, which are hereby incorporated by reference in their respective entireties.

TECHNICAL FIELD

The present disclosure relates to a device and method for detecting reactive luminescent particles embedded in a substrate or surface comprising: an infrared or ultraviolet illuminator for illuminating the luminescent particles; a near-infrared photodiode sensor for capturing a near-infrared response of the illuminated luminescent particles; a dark chamber for placing over the substrate or surface, inside which the illuminator and photodiode sensor are mounted; a logarithm amplifier for amplifying and linearizing a signal captured by the photodiode sensor; an electronic data processor configured for detecting the reactive luminescent particles, by carrying out the steps of: illuminating the substrate or surface with the illuminator; acquiring the amplified linearized signal captured by the photodiode sensor; detecting the presence of luminescent particles in the substrate or surface from the linearized decay of the acquired signal.

BACKGROUND

Small LNP's (Luminescent Nano-particles) of 5 microns or less react when illuminated with an infra-red source of light. The reaction is reflective energy on different wavelengths and usually observed and examined using a spectrometer reader. These LNP's are usually mixed with different materials, called "substrates" and are used for many applications namely as part of an anti-counterfeit solution.

A very know anti-counterfeit using this kind of solution for example, and beyond other technologies, banknotes uses IR ink properties. The amount of LNP's used is minute, making the detection an extremely difficult task and usually only possible under laboratory and/or in controlled environment. The motivation of this invention is to create an apparatus for users to evaluate materials giving the opportunity to detect the presence of LNP's, identifying and quantifying, at very low concentrations, and checking its veracity. Concentrations can be down to 10 ppm (or less) and in dark substrates where most of light is absorbed by its material making it very difficult to detect LNPs and where others apparatus fails due lack of sensitivity.

Patent document WO1989008224A1 discloses a luminescent fiber marker and method comprised of a linear coaxial lens having an elongated thin cylindrical phosphorescent layer and a pair of colinear and coaxial optical waveguides sandwiching the thin cylindrical phosphorescent layer therebetween so that light impinging on said cylindrical phosphorescent layer along the length thereof is induced to store said radiation energy in said light and emit radiation of a different wave length from the light impinging on said cylindrical phosphorescent layer into both of said optical waveguides. Each of said optical waveguides has a fluorescent material dispersed therein for absorbing the emitted radiation from said phosphorescent layer reemitting the absorbed radiation to affect an internal scatter of radiation in each of said waveguides to permit trapping within the waveguide cores. At least one of the ends of the pair of colinear and coaxial waveguides is adapted to emit said light of a different wave length, the ends may be arranged in various patterns and/or have diffuser or mirrors associated therewith.

These facts are disclosed in order to illustrate the technical problem addressed by the present disclosure.

GENERAL DESCRIPTION

The present disclosure aims to detect a variety of infrared (IR) or ultraviolet (UV) Luminescent Nano-particles (LNP) when receiving energy with wavelengths near 940 nm are reacting and transmitting energy back over 980 nm wavebands. Under laboratory conditions, isolated LNPs with high concentrations, (more than 400 ppm), is quite easy to detect and recognised. Reducing concentrations down to 10 ppm keeping all the abilities of detection and recognition is desire to reduce costs on the use of LNPs. One of the motivations of present implementation is to have a small apparatus, portable and manageable with most of features found on laboratory equipment.

In a real application, the LNPs covered a surface or are embedded on a substrate creating additional challenges for detection and recognition. Also, the colour of substrates creates barriers for detection, putting boundaries on unsustainable levels of LNPs use. Black and dark colours are the worst cases where most of light from LNPs emissions is absorbed by substrates. One way to solve this effect is increasing the power of incident light and increasing also the sensitivity of the light sensor.

It is disclosed a purpose embodiment of a small portable enclosure with a bottom rip to light pass through to a cavity wherein the use of light emitter and light sensor are located inside. The disposal of light emitter and light sensor are in such way to reduce losses and having maximum incident energy over observed surface or subtract. Use of SMT devices for light emitter and light sensor, LED and photodiode respectively, simplifies the implementation, since, once by reducing the degrees of freedom of one dimension the alignment is only possible by using the remaining two dimensions.

In an embodiment, the IR or UV illuminators light intensity are controlled by a drive based on a controlled constant current power supply.

In an embodiment, the apparatus tune light intensity for a given substrate by varying DAC value.

In an embodiment, all independent signals from all photodiodes, digital converted, can be combined; wherein said combined are mathematical operations of digital signals: addition, subtraction, multiplications or combinations thereof.

In an embodiment, these mathematical operations are used for identification and quantification of reactive luminescent nano-particles.

In an embodiment, in all photodiodes is used independent logarithm amplifiers circuits a second stage of a linear amplification;

In an embodiment, these additional second stage of amplification connects to an independent ADC input channel.

In an embodiment, these additional second stage of amplification is used for identification and quantification of very low concentrations of reactive luminescent nano-particles.

In an embodiment, the substrate is a textile, a leather, a wood, a paper, a plastic, a metal, or combinations thereof.

In an embodiment, one or more IR illuminators are LED IR illuminators or Laser IR illuminators.

In an embodiment, one or more UV illuminators are LED UV illuminators or Laser UV illuminators.

It is disclosed an embodiment for a device for detecting reactive luminescent nano- or micro-particles embedded in a substrate or surface comprising: an infrared or ultraviolet illuminator for illuminating the luminescent particles; a near-infrared photodiode sensor for capturing a near-infrared response of the illuminated luminescent particles; a dark chamber for placing over the substrate or surface, inside which the illuminator and photodiode sensor are mounted; a logarithm amplifier for amplifying and linearizing a response signal captured by the photodiode sensor; an electronic data processor configured for detecting the reactive luminescent particles, by carrying out the steps of: illuminating the substrate or surface with the illuminator; acquiring the amplified linearized signal captured by the photodiode sensor; detecting the presence of the luminescent particles in the substrate or surface from the linearized decay of the acquired signal.

The chamber is useful for creating a space for particles to be luminescent when receiving IR or UV illumination.

In an embodiment, said device comprises a further near-infrared photodiode sensor with a different spectral sensitivity response from the first photodiode sensor, a further logarithm amplifier for amplifying and linearizing a signal received by the further photodiode sensor, and a differentiator for obtaining a difference between amplified signals received by each photodiode sensor.

In an embodiment, the electronic data processor is configured for detecting peaks in a time-domain signal of said difference above a predetermined threshold.

In an embodiment, the electronic data processor is configured for distinguishing between luminescent particles having a different spectral response from the detected peaks.

In an embodiment, said device comprises a linear amplifier for further amplifying the amplified linearized signal captured by each photodiode sensor.

In an embodiment, the luminescent particles are reactive with wavelengths of 750-2500 nm, in particular of 750-1100 nm.

In an embodiment, the IR illuminator is a LED IR illuminator or laser IR illuminator.

In an embodiment, the UV illuminator is a LED UV illuminator or laser UV illuminator.

In an embodiment, the substrate is a textile substrate, a paper substrate, a plastic substrate, a metal substrate, a cork substrate, a wood substrate, a leather substrate, a fur substrate or combinations thereof.

In an embodiment, the logarithm amplifier is an OP-AMP logarithm amplifier.

In an embodiment, the reactive luminescent nano- or micro-particles comprise a core of rare earth ceramic material selected from a group of $La^{3+}$; $Ce^{3+}$, $Pr^{3+}$, $Nd^{3+}$; $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, or combinations thereof.

In an embodiment, the reactive luminescent nano- or micro-particles having a particle size between 10 nm to 25 µm, in particular of 20-20 µm.

It is also disclosed a computer-based method for detecting reactive luminescent nano- or micro-particles embedded in a substrate or surface, comprising carrying out by an electronic data processor the steps of: illuminating the substrate or surface with an infrared or ultraviolet illuminator for illuminating the luminescent particles; capturing a near-infrared response of the illuminated luminescent nano-particles with a near-infrared photodiode sensor, wherein the illuminator and photodiode sensor are mounted inside a dark chamber placed over the substrate or surface; amplifying and linearizing a response signal captured by the photodiode sensor with a logarithm amplifier; acquiring the amplified linearized signal captured by the photodiode sensor; detecting the presence of the luminescent particles in the substrate or surface from the linearized decay of the acquired signal.

In an embodiment, the method further comprising the steps of: amplifying and linearizing, by a further logarithm amplifier, a signal received by a further near-infrared photodiode sensor with a different spectral sensitivity response from the first photodiode sensor; obtaining a difference, by a differentiator, between amplified signals received by each photodiode sensor.

In an embodiment, the method further comprising the steps of: detecting peaks in a time-domain signal of said difference above a predetermined threshold.

In an embodiment, the method further comprising the steps of: distinguishing between luminescent particles having a different spectral response from the detected peaks.

In an embodiment, the luminescent nano-particles can be reactive with wavelengths of 750-2500 nm, in particular of 750-1100 nm.

In an embodiment, the method comprises the substrate that can be a textile substrate, a paper substrate, a plastic substrate, a metal substrate, a cork substrate, a wood substrate, a leather substrate, a fur substrate or combinations thereof.

In an embodiment, the method comprises the substrate that can be the reactive luminescent nano- or micro-particles comprise a core of rare earth ceramic material selected from a group of $La^{3+}$; $Ce^{3+}$, $Pr^{3+}$, $Nd^{3+}$; $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, or combinations thereof.

Non-transitory storage media including program instructions for implementing a computer-based method for detecting a reactive luminescent nano-particles in a substrate or surface, the program instructions including instructions executable by a data processor to carry out any of the disclosed methods.

BRIEF DESCRIPTION OF THE DRAWINGS

The following figures provide preferred embodiments for illustrating the disclosure and should not be seen as limiting the scope of invention.

DETAILED DESCRIPTION

Figure 1:
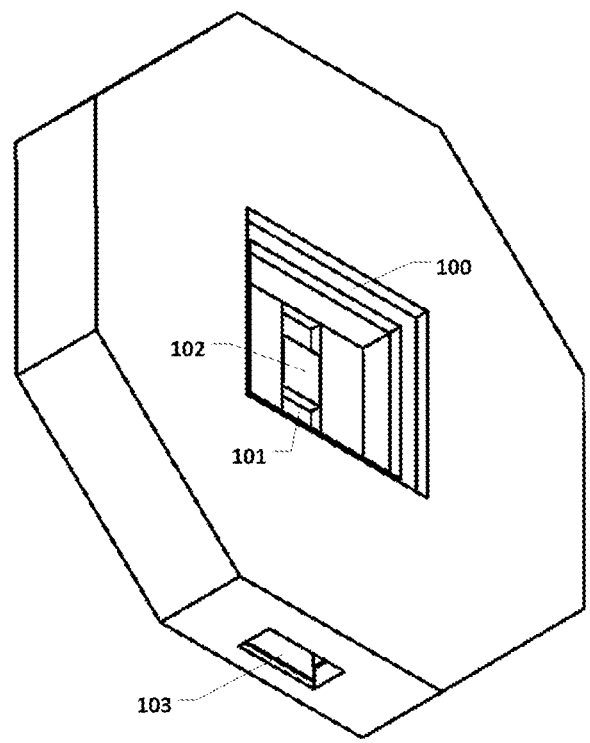
FIG. 1: Schematic representation of an embodiment of the device.

FIG. 1 shows a schematic representation of an embodiment of enclosure, bottom view, where rip 100 is used to allow light passing from emitters 101 to substrate where is reflected and back in to photodiode sensor 102. Lateral opening is used by a USB 103 cable connection to power supply apparatus and for communication purposes.

Figure 2:
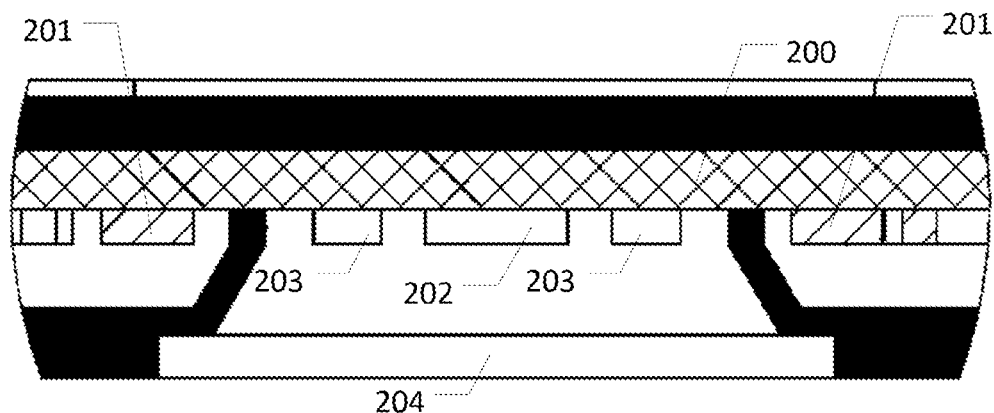
FIG. 2: Schematic representation of an embodiment of the detailed transversal cut of enclosure.

FIG. 2 shows a detailed transversal representation of a cut of enclosure where it can be seen PCB 200 with upside down SMT components 201, in center photodiode sensor 202 and side by side the two light emitters 203. On bottom an acrylic glass 204 to protect from dust and used on this embodiment as visible light cut filter.

Figure 3:
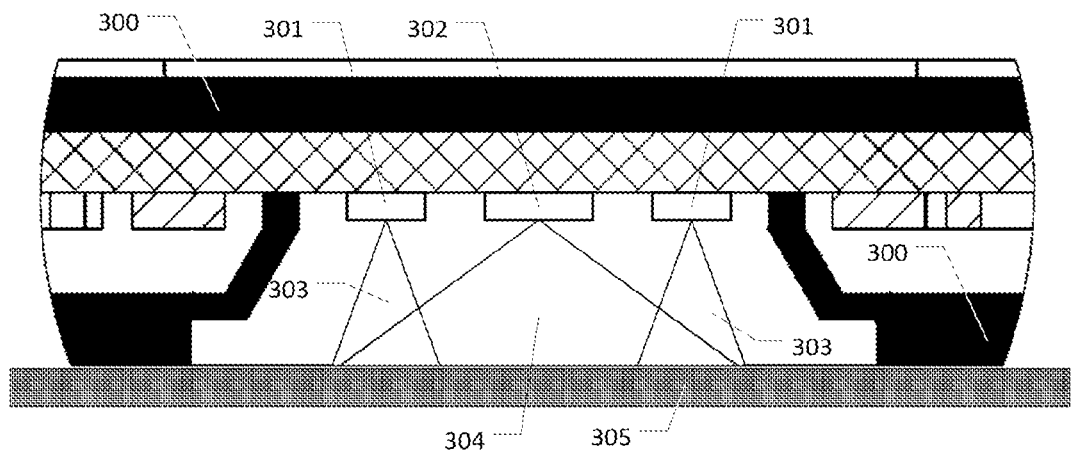
FIG. 3: Schematic representation of an embodiment of the detailed transversal cut of enclosure.

FIG. 3 shows a detailed transversal cut of enclosure 300 where it can be seen upside down SMT emitters 301 and photodiode sensor 302 with respective light angles scheme, incidence 303 and return 304 over and from the substrate 305.

Figure 4:
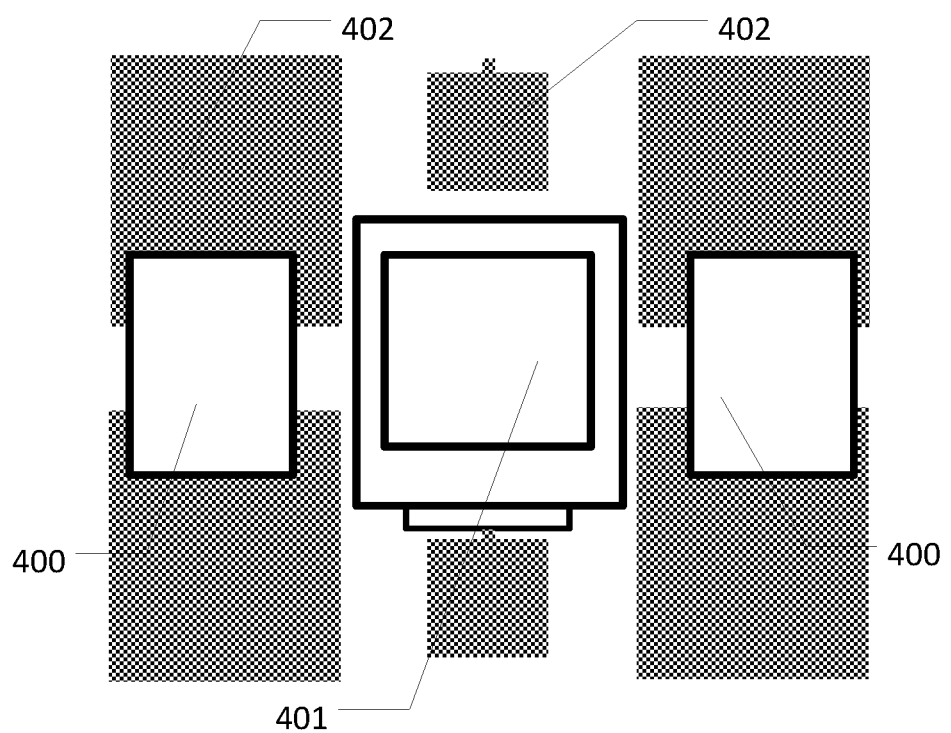
FIG. 4: Schematic representation of an embodiment of the PCB layout for two LED placed side by side of photodiode sensor; the gray squares are SMT solder pads.

FIG. 4 shows a schematic representation of an embodiment PCB layout for two LED 400 placed side by side of photodiode sensor 401; the gray squares are SMT solder pads 402.

Figure 5:
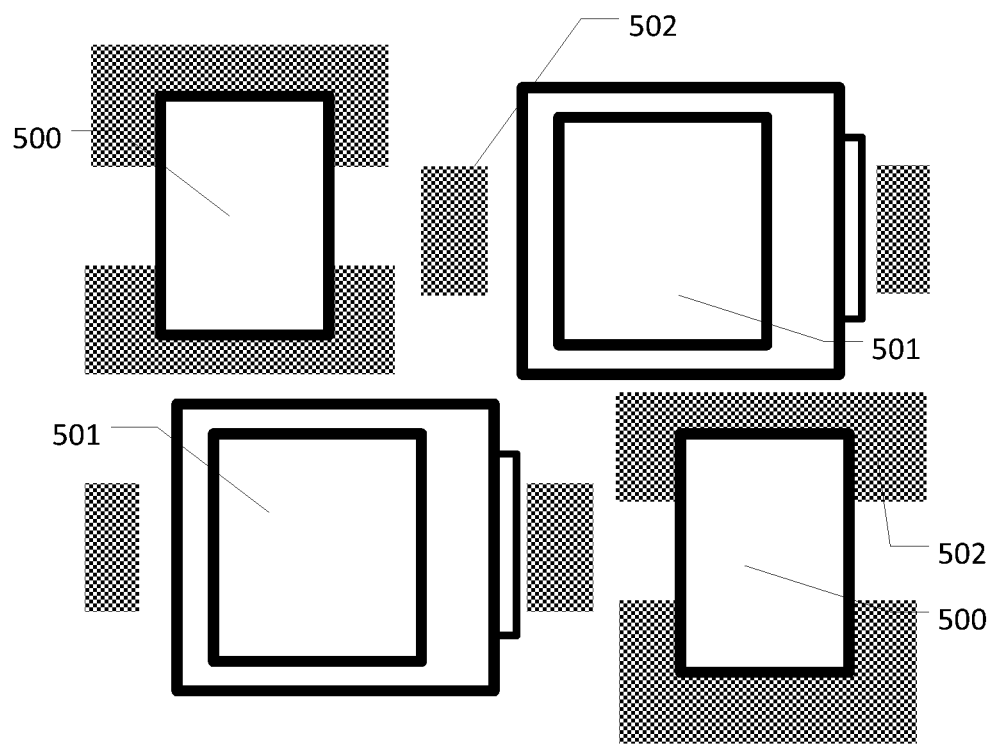
FIG. 5: Schematic representation of an embodiment for a PCB layout for two SMT LED and two SMT photodiodes sensors.

FIG. 5 shows a schematic representation of an embodiment preferable for a PCB layout for two SMT LED 500 and two SMT photodiodes sensors 501; the gray forms are SMT solder pads 502.

Figure 6:
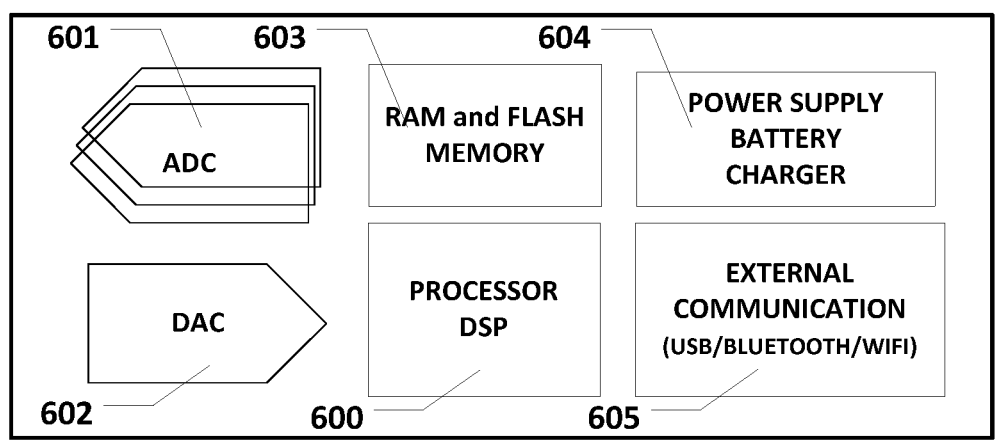
FIG. 6: Schematic representation of an embodiment of the block diagram of modules microcontroller divided by main functionalities.

FIG. 6 shows a block diagram of modules microcontroller divided by main functionalities (processor with DSP instructions 600, ADC 601 with different input channels, DAC 602, RAM and flash memory 603, power supply with battery and battery charger circuit 604, several external communication possibilities 605 such as USB, Bluetooth, WiFi among other possibilities).

Figure 7:
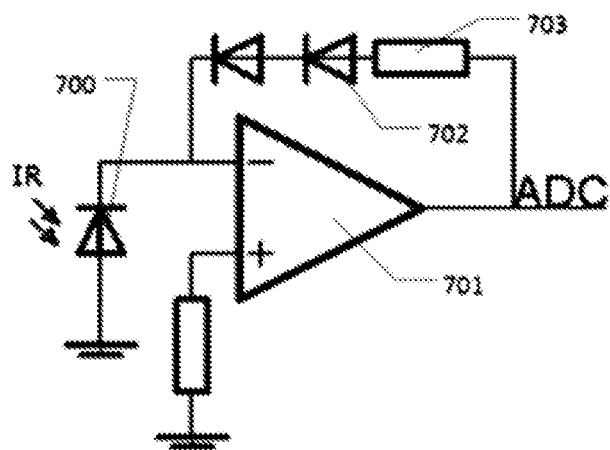
FIG. 7: Schematic representation of an embodiment of the circuit of photodiode with logarithm OP-AMP made by loop gain diodes and resistor.

FIG. 7 shows a detailed circuit of photodiode 700 with logarithm OP-AMP 701 made by loop gain diodes 702 and resistor 703.

Figure 8:
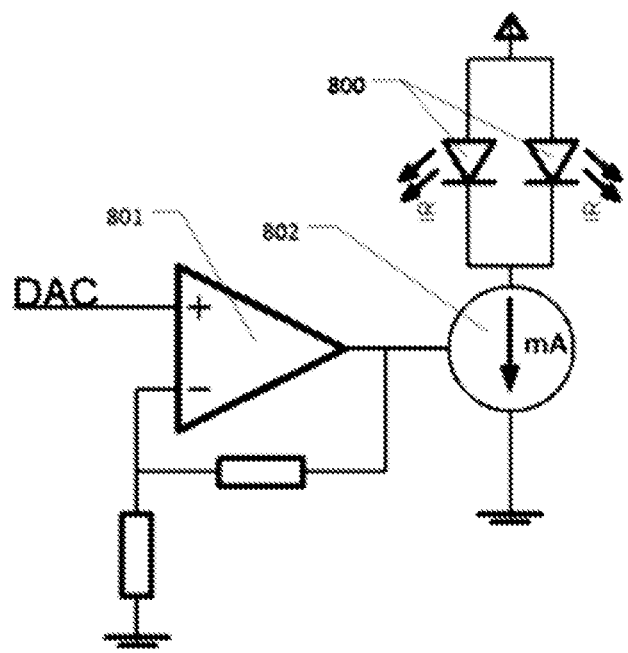
FIG. 8: Schematic representation of an embodiment of the drive circuit for IR or UV LEDs, controlled by DAC signal with OP-AMP and constant current power source.

FIG. 8 shows a drive circuit for IR or UV LEDs 800, controlled by DAC signal with OP-AMP 801 and constant current power source 802.

Figure 9:
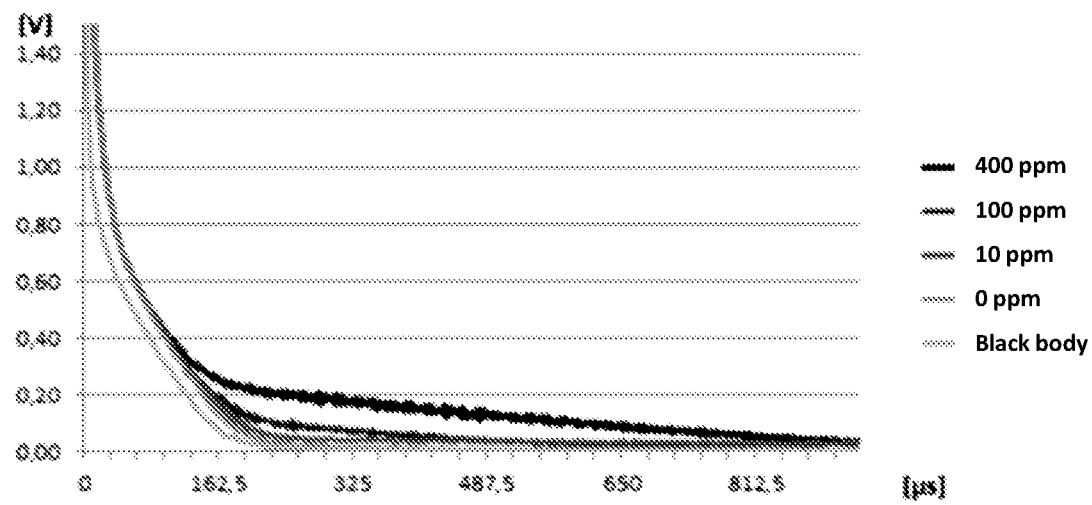
FIG. 9: Illustration of results from embodiment with one photodiode sensor for a given substrate where LNPs are present with 400 ppm, 100 ppm, 10 ppm, no LNPs and black body.

FIG. 9 shows the results got from embodiment with one photodiode sensor for a given substrate where LNPs are present with 400 ppm, 100 ppm, 10 ppm, no LNPs and black body (only apparatus reflections).

Figure 10:
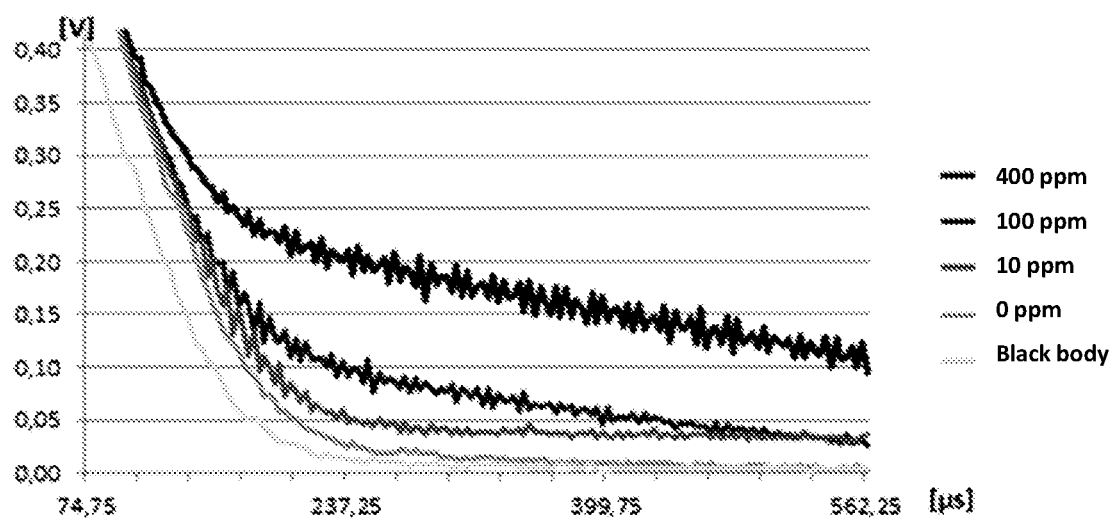
FIG. 10: Illustration of results of LNPs are present with 400 ppm, 100 ppm, 10 ppm, no LNPs and black body.

FIG. 10 shows the results got from embodiment with one OP-AMP logarithm circuit and second stage OP-AMP circuit for a given LNP with 10 ppm concentration.

Figure 11:
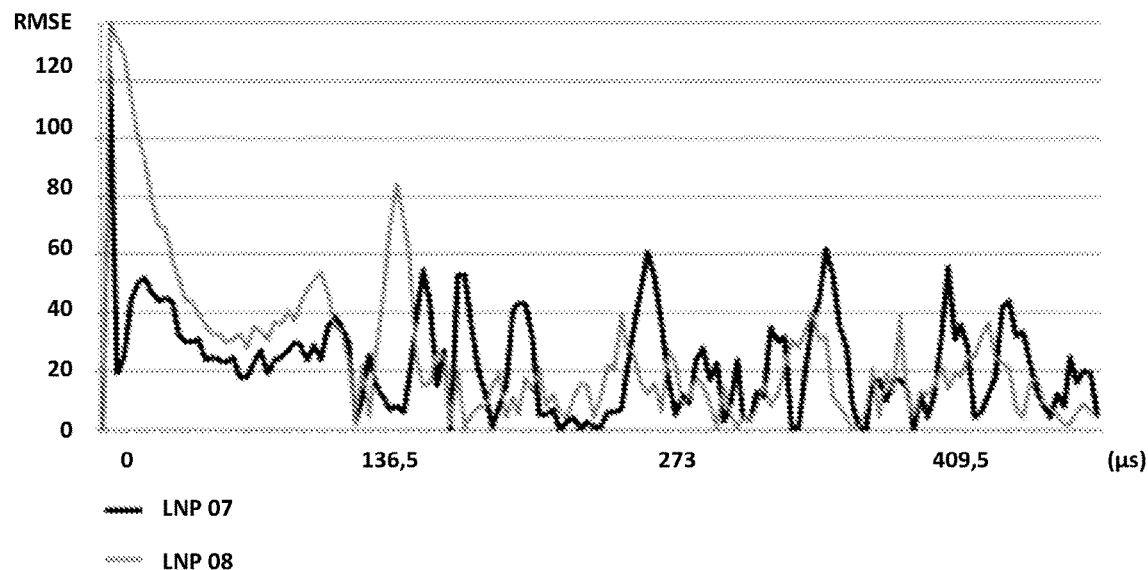
FIG. 11: Illustration of results of from embodiment with two different photodiodes sensors, for a set of substrates, where LNP07 and LNP08 are present in different sets of concentrations. Graphic is showing the Root Mean Square Deviation of difference between photodiodes signals, function in time.

FIG. 11 shows the results got from embodiment with two different photodiodes sensors, for a set of substrates, where LNP07 and LNP08 are present in different sets of concentrations. Graphic is showing the Root Mean Square Deviation of difference between photodiodes signals, function in time.

Figure 12:
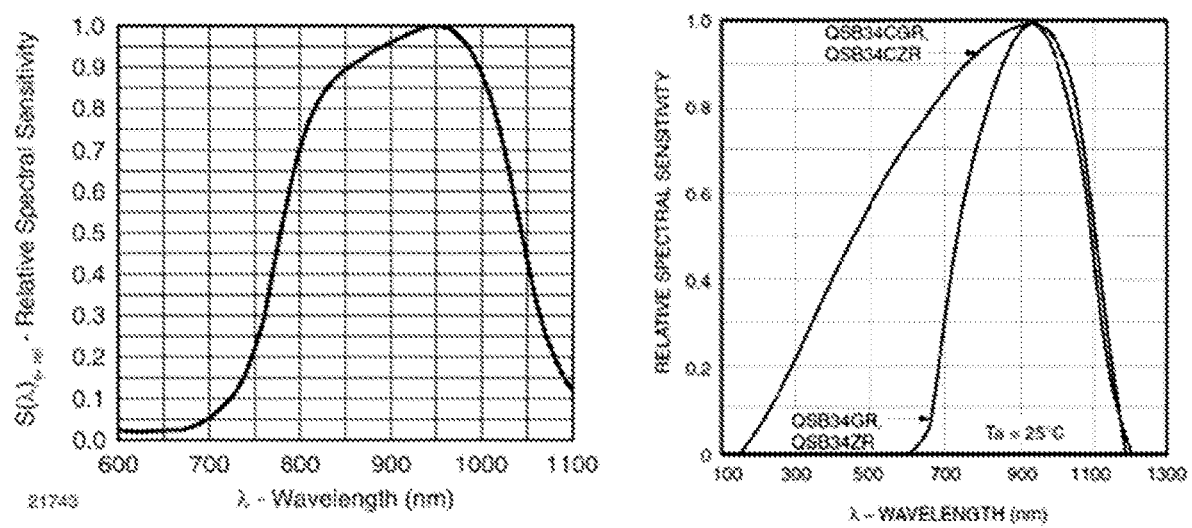
FIG. 12: shows the illustration of the wavelength spectral response of two different photodiodes of different suppliers.

FIG. 12 shows the Illustration of the wavelength spectral response of two different photodiodes of different suppliers.

Due to small amount of energy received from LNPs the enclosure rip and cavity will work as a dark chamber where an acrylic glass is placed on front. This acrylic glass has the function to protect emitters and sensors against dust and dirty, also is used for visible light cut filter. Dimensions are playing with direction and angle of incident light beam on substrate and respective reflective energy traveling back to the photodiode sensor. The sensor will have also an optimum angle and optimum direction where maximises the converted of received energy to electrical signal.

The sensor electrical signal needs to be amplified and accommodate to ADC levels enabling to be analysed. It is disclosing the use of a logarithm OP-AMP based circuit giving a large amplification for small signals. Additionally, a second stage of a linear amplification, on output of logarithm OP-AMP based circuit, is used to increase more sensitivity.

Due of high level of sensitivity, it is very important to avoid environment common light to reached photodiodes. A true dark chamber is mandatory but not enough, light pass through the rip enclosure of the apparatus and only IR or UV light belonging to LEDs and LNPs emission. Enclosure has a flat surface where acrylic filter is completed align and without any gaps allowing a perfect contact with substrates. Apparatus is put down on a given substrate and before the illumination of substrate with IR or UV light, the dark level is measured. Under such conditions, if the photodiodes receives a level of signal over what was defined for the limit, the user is informed for the fact giving the chance to move apparatus for a better position. The process of a data acquisition is going to start by ADC where DAC level goes to maximum level of IR or UV light and loops decreasing intensity step by step. The signal obtained need to have a form as FIG. 9 allowing apparatus to be used for identification and quantification. Understanding the term identification as recognition of a given LNP presented in substrate and the term quantification the concentration of LNPs in substrate.

Software algorithms for the purposed are implemented in DSP where results are transmitted through an external communication channel: USB, Bluetooth, WiFi, among other possibilities.

In a possible implementation scenario, identification and quantification values are stored in a remote storage infrastructure: database or block-chain. The preferable embodiment, apparatus is connected using a USB cable with an external device as smartphone, tablet or even a computer. This external unit, by user request, starts an acquisition informing apparatus for location, date and time. The apparatus receiving such information from external device creates then a package information with identification and quantification parameters added by location, date and time. In the end, send package information to remote storage infrastructure.

On the electronic circuit, each photodiode is inversed polarised where signal is amplified by independent OP-AMP logarithm based circuit connected to different ADC's channels. One of photodiode used VBP104FAS from Vishay Semiconductors which has a good response to infra-red light. Similar devices with different spectral response are use from others manufactures such as OSRAM, ON SEMICONDUCTOR among others.

Infra-red or ultraviolet emitters are driven by an ON-OFF circuit together with OP-AMP connected to DAC enabling to control current circuit varying light intensity. The IR LED's drive is power supply by a constant current circuit. The infra-red emitters are LED base component with high power and narrow beam from OSRAM Opto Semiconductors, reference SFH4640 where, according with manufacture, radiant intensity can reach 1050 mW/sr. A microcontroller is used to adequate infra-red or ultraviolet light to medium and acquiring data for post processing.

The preferable embodiment by using a DAC output from a microcontroller, can adjust the intensity of infra-red light and also controlling signal format. With these intensity and time control the apparatus can adequate or tune IR or UV LEDs to the observed substrate taking the maximum level of reflect energy from LNPs and avoids photodiodes sensors saturation. Doing this light control, a tune process, apparatus increases the range of detection special for high concentration of LNPs.

After shut off of IR or UV light the LNPs return energy is decreasing with a giving constant of time and following a natural negative exponential. The photodiode sensor is amplified by a logarithm OP-AMP circuit where the result, input signal in ADC, is a line, function of time where the slope is directly proportional to the decay time of LNP.

Quantification of a given substrate with LNPs, number of particles per square centimetre detected by sensor, is related to the time when light energy reaches the dark level.

Substrates with small amount of LNPs, e.g. 10 ppm, the return signal will be very weak. Adding a second stage of amplification signals can be observed and used for identification and quantification. However, this circuit is saturated for higher concentrations. This is the reason to have both signals, output from logarithm OP-AMP and output from second stage of amplification, entering in different ADCs channels, giving the possibility to process different levels of LNPs concentration.

For identification, it is possible by using the difference between signals from sensors. Since, photodiodes are different with different wavelength spectral response, there will be obtained different signals. Obtaining Computing the Root Mean Square Deviation of each point of time signals, it is possible to characterise and associate each LNP for a given signature.

It is disclosed an apparatus comprising a dark chamber enclosure for recognising infrared, IR, and ultraviolet, UV, reactive luminescent nano-particles in a substrate using a set of sensors, said device comprising: one or more IR or UV illuminators for illuminating the luminescent nano-particles; a rip to allow light pass through; a drive based on constant current source; set of sensors based on photodiodes; a set of logarithm amplifiers OP-AMP based; a microcontroller with several ADC input channels and DAC output; wherein all photodiodes are different in terms of spectral sensitivity response; wherein all photodiodes has independent logarithm amplifiers circuits; wherein all independent photodiodes logarithm amplifiers signal are connected to different microcontroller ADC input channels; wherein IR or UV illuminators drive is controlled by a DAC microcontroller signal.

The term "comprising" whenever used in this document is intended to indicate the presence of stated features, integers, steps, components, but not to preclude the presence or addition of one or more other features, integers, steps, components or groups thereof.

The disclosure should not be seen in any way restricted to the embodiments described and a person with ordinary skill in the art will foresee many possibilities to modifications thereof. The above described embodiments are combinable.

The following claims further set out particular embodiments of the disclosure.

The invention claimed is:

1. A device for detecting reactive luminescent nano- or micro-particles embedded in a substrate or surface comprising:
    an infrared or ultraviolet illuminator configured to illuminate the luminescent particles;
    a near-infrared photodiode sensor configured to capture a near-infrared response of the illuminated luminescent particles;
    a dark chamber suitable for placement over the substrate or surface, inside which the illuminator and photodiode sensor are mounted;
    a logarithm amplifier configured to amplify and linearize a response signal captured by the photodiode sensor; and
    an electronic data processor configured to detect the reactive luminescent particles, by carrying out the steps of:
        illuminating the substrate or surface with the illuminator;
        acquiring the amplified linearized signal captured by the photodiode sensor; and
        detecting the presence of the luminescent particles in the substrate or surface from a linearized decay of the acquired signal.

2. The device according to claim 1, wherein said electronic data processor is further configured for controlling the light intensity of the IR or the UV illuminators such that the captured signal has the near-infrared response of the luminescent particles without a near-infrared response of the substrate or surface.

3. The device according to claim 1, wherein said device comprises a further near-infrared photodiode sensor with a different spectral sensitivity response from the first photodiode sensor, a further logarithm amplifier for amplifying and linearizing a signal received by the further photodiode sensor, and a differentiator for obtaining a difference between amplified signals received by each photodiode sensor.

4. The device according to claim 1, wherein the electronic data processor is configured for detecting peaks in a time-domain signal of said difference above a predetermined threshold.

5. The device according to claim 1, wherein the electronic data processor is configured for distinguishing between luminescent particles having a different spectral response from the detected peaks.

6. The device according to claim 1, wherein said device comprises a further microcontroller with a plurality of analog-to-digital converter ("ADC") input channels and a digital-to-analog converter ("DAC") output, wherein the DAC output is configured to control the light intensity of the IR or UV illuminators and wherein the ADC input is connected to the near-infrared photodiode sensor or sensors.

7. The device according to claim 1, wherein said device comprises a linear amplifier for further amplifying the amplified linearized signal captured by each photodiode sensor.

8. The device according to claim 1, wherein said IR illuminator is a LED IR illuminator or laser IR illuminator.

9. The device according to claim 1, wherein said UV illuminator is a LED UV illuminator or laser UV illuminator.

10. The device according to claim 1, wherein the substrate is selected from the group consisting of: a textile substrate, a paper substrate, a plastic substrate, a metal substrate, a cork substrate, a wood substrate, a leather substrate, a fur substrate, and combinations thereof.

11. The device according to claim 1, wherein the logarithm amplifier is an OP-AMP logarithm amplifier.

12. The device according to claim 1, wherein the reactive luminescent nano- or micro-particles comprise a core of rare earth ceramic material selected from the group consisting of: $La^{3+}$; $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, and combinations thereof.

13. A computer-based method for detecting reactive luminescent nano- or micro-particles embedded in a substrate or surface, comprising carrying out by an electronic data processor the steps of:
  illuminating the substrate or surface with an infrared or ultraviolet illuminator for illuminating the luminescent particles;
  capturing a near-infrared response of the illuminated luminescent nano-particles with a near-infrared photodiode sensor, wherein the illuminator and photodiode sensor are mounted inside a dark chamber placed over the substrate or surface;
  amplifying and linearizing a response signal captured by the photodiode sensor with a logarithm amplifier;
  acquiring the amplified linearized signal captured by the photodiode sensor; and
  detecting the presence of the luminescent particles in the substrate or surface from a linearized decay of the acquired signal.

14. The method according to claim 13, further comprising the steps of:
  amplifying and linearizing, by a further logarithm amplifier, a signal received by a further near-infrared photodiode sensor with a different spectral sensitivity response from the first photodiode sensor; and
  obtaining a difference, by a differentiator, between amplified signals received by each photodiode sensor.

15. The method according to claim 14, further comprising the step of: detecting peaks in a time-domain signal of said difference above a predetermined threshold.

16. The method according to claim 15, further comprising the step of: distinguishing between luminescent particles having a different spectral response from the detected peaks.

17. The method according to claim 16, further comprising controlling the light intensity of the IR or UV illuminators such that the captured signal has the near-infrared response of the luminescent particles without a near-infrared response of the substrate or surface.

18. The method according to claim 13, wherein the substrate is selected from the group consisting of: a textile substrate, a paper substrate, a plastic substrate, a metal substrate, a cork substrate, a wood substrate, a leather substrate, a fur substrate, and combinations thereof.

19. The method according to claim 13, wherein the reactive luminescent nano- or micro-particles comprise a core of rare earth ceramic material selected from the group consisting of: $La^{3+}$; $Ce^{3+}$, $Pr^{3+}$, $Nd^{3+}$; $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, and combinations thereof.

20. A non-transitory storage media including program instructions for implementing a computer-based method for detecting a reactive luminescent nano-particles in a substrate or surface, the program instructions including instructions executable by a data processor to carry out the method of claim 13.

* * * * *